United States Patent Office 3,093,630
Patented June 11, 1963

3,093,630
PROCESS FOR PURIFICATION OF CITRUS OIL
Fred W. Muncie, Lake Wales, Fla., assignor to Suni-Citrus Products Company, Haines City, Fla., a corporation of Florida
No Drawing. Filed Oct. 16, 1959, Ser. No. 846,787
2 Claims. (Cl. 260—236.6)

This invention relates to a process for the purification of limonene and particularly to such a process employing citrus products especially citrus press water which is obtained in processing citrus peel and pulp. Therefore, this invention is in the general art of citrus refuse processing to obtain valuable oils and chemicals therefrom and especially to the purification of one particular material called limonene which has deteriorated due to oxidation.

Limonene is a liquid terpene, $C_{10}H_{16}$, occurring in two optically different forms, the dextrorotatory form being present in the essential oils of lemon, orange, and so forth, and the levorotatory form in Douglas fir needle oil. It is well known that limonene is subject to air oxidation and that the spoilage of citrus oils on aging is largely due to air oxidation of the limonene present. It can be taken as a rule that the higher the limonene content, the more readily does oxidation occur. Thus, "stripper" oil, which is in substances the portion of cold pressed oil volatile with steam in the processing of citrus refuse such as citrus pulp and peel, to obtain usable and essential oils, chemicals and edible animal foods, and which will contain around 97% limonene is more readily oxidized than is cold pressed oil, which is also removed in the processing of citrus material, the limonene content of which is about 90%. The change in the odor and the flavor of limonene produced by the oxidation products is so pronounced that the deteriorated oil is unsuitable for use in the essential oil trade. With respect to processes based on reactions of limonene, any air oxidation of limonene therein reduces the content in the raw material to that extent. More serious are the presence in the final product of these oxidation materials, leading to loss of quality.

The first step in air oxidation is considered to be the formation of one or more hydroperoxides and the course of this reaction is best measured by the potassium iodide, sodium thiosulfate test. This test, however, does not completely indicate the extent of oxidation, for the hydroperoxide itself acts as an oxidizing agent as well as a polymerization catalyst, so that a number of secondary products are formed which do not react with iodide. Among these are d-carvone, polyhydroxy compounds and high molecular weight polymers. Their presence is recognized in control tests by a lower than normal optical rotation and especially by a marked rise in the end point of the Engler Boiling Range determination or the non-volatility of the last fraction of the oil. It is seldom that citrus oil exposed to the air is oxidized to a greater extent than 50%; it is probable that the polyhydroxy compounds formed in the secondary reactions act as antioxidants. In fact, the high boiling fraction of an oxidized oil can be demonstrated to have antioxidant properties.

It is customary in the citrus by-products industry to redistill with steam, oil which has been allowed to deteriorate. Such an operation will separate the limonene from the high boiling impurities. However, it is not efficient in ridding the oil of limonene hydroperoxides, since these are to some extent volatile with steam. A single set of tests will serve to illustrate this:

| Sample | Peroxide number | Boiling range | | |
|---|---|---|---|---|
| | | Initial | 95% | 97% |
| Deteriorated | 17.5 | 174.2 | 184.5 | 198.2 |
| Same redistilled | 5.4 | 174.2 | 180.6 | 183.0 |

In order to secure a complete removal of the hydroperoxide, a reducing substance should be provided during the distillation. It has now been found that substances present in citrus press water are efficient reducing agents. By citrus press water is meant the water soluble material obtained by pressing citrus refuse which has been limed and allowed to age to facilitate the pressing operation. Citrus press water is thereby obtained in the processing of citrus refuse in the production of cattle feed and in the securing of valuable by-products such as essential oils and the like. This process has generally been operated as follows: Press water stock for the production of citrus molasses, or citrus molasses itself diluted to a suitable concentration (for example 10 to 20° Brix) for handling in the equipment, is circulated through the system of (a) preheater; (b) sparger; (c) flash chamber from which a portion of the water is flashed off as steam carrying the limonene with it while the residual liquor drops to a vessel for recirculation. The oil to be processed is introduced to the steam just prior to its entrance to the preheater. At this point, some elevation of temperature above room temperature is desirable to speed up the reaction and the operative temperature of about 212° and somewhat higher has been found satisfactory. The press water referred to herein, sometimes referred to as press liquor, peel juice, or press juice, however it might be called, usually contains 8 to 15% total dissolved solids, of which more than half are sugars. It has a pH ranging from 5.5 to 7.0. It is normally concentrated to provide what is called citrus molasses.

This process has been found to be practical and to give a distilled oil free from hydroperoxide. It is particularly suitable when a quantity of oil is to be reprocessed and the equipment needed is not being employed in regular processing. During the operation of the stripper process in regular production, however, a still more efficient procedure has been employed, that is to introduce the oil to be reworked into the stream of press water flowing onto the system and to regenerate the oil in the flashing operation by which the oil in the press water is removed. That it is possible to do this depends on the following: In the presence of an excess of limonene, it is volatile with steam in the proportion of one part of limonene to 1½ parts of steam. When less limonene is present, however, more steam is required and in practice as much as 10 parts of steam per part of limonene may be employed with press water that contains 1% or less of limonene. If additional oil is added, its removal by steam is made easier and no additional steam is required. Thus, the cost of purifying oil, with the stripper process in operation, is limited to its handling cost.

*Example 1.*—500 ml. of de-oiled press water was refluxed for one hour with 50 ml. of "stripper" oil having a peroxide number of 20.5. At the end of the operation, the peroxide number had dropped to 0.40.

*Example 2.*—50 gms. of citrus molasses were diluted to 500 gms. with water, heated to reflux and to the flask were added 50 ml. of "stripper" oil having a peroxide number of 15.6. Refluxing was continued one hour. After standing, the aqueous material and emulsion present were drawn off, leaving 15 ml. of clear yellow oil. This oil tested negative to the peroxide test.

*Example 3.*—50 gms. of citrus molasses were diluted to 500 gms. and steam distilled, adding during the operation 100 ml. of "stripper" oil with a peroxide number of 15.6. The first 25 ml. oil off had a peroxide number of 1.00, the second 26 ml. one of 0.65 and the third fraction of 39 ml. one of 0.25. On exposure to air for 7 days, the peroxide number of the distilled oil rose to 25.5.

*Example 4.*—1000 ml. press water (Brix about 12°) and 20 ml. of "stripper" oil with a peroxide number of 22.15 were heated to boiling and 136 ml. of water distilled carrying with it 24 ml. oil. This oil had a peroxide number of 0.80.

*Example 5.*—With a rate of flow of about 6000 gals. per hour of press water through the stripper system, 110 gals. per hour of oil to be reworked were introduced into the system. This press water contained about 0.5% of steam volatile oil equivalent to 255 lbs. per hour whereas 770 lbs. of oil to be reworked were added. The operation proceeded smoothly and the oil obtained from the day's run had a peroxide number of zero.

There is nothing particularly critical about the relative proportions of water soluble components and the degraded limonene which is to be purified. Operating proportions of the water soluble material and the degraded limonene may be found by computations from the examples given heretofore and these proportions may be considered as a preferred limitation thereof. It would seem the amount of limonene that may be added to the system might be increased until a ratio of 1:1.5 based on the steam removed in the flashing operation is reached.

While I have described a particular embodiment of my invention, together with suggested limitations and examples thereof, this is not to be construed as any sort of limitation on the scope thereof since various changes and alterations may be made without departing from the scope of my invention as defined in the appended claims.

I claim:
1. A process for purification of citrus oil degraded by the air oxidation of the limonene therein, consisting of: introducing said degraded citrus oil into heated citrus refuse solubles in aqueous solution, and thereafter, continuously steam distilling to recover the volatile portion of the said oil from the resulting mixture.

2. A process for substantially destroying the hydroperoxides present in citrus oil which has been degraded by air oxidation of the limonene therein consisting of: reacting the oil with an aqueous solution of citrus refuse solubles for a period of about one hour until the oil tests substantially free from hydroperoxide.

References Cited in the file of this patent

UNITED STATES PATENTS

| | | |
|---|---|---|
| 1,814,888 | Bennett | July 14, 1931 |
| 2,282,808 | Musher | May 12, 1942 |
| 2,657,997 | Rusoff et al. | Nov. 3, 1953 |
| 2,945,068 | Booth | July 12, 1960 |

OTHER REFERENCES

More et al.: Jour. Amer. Chem. Soc., Volume 78, pages 1173–1176.